United States Patent [19]
Matsushita et al.

[11] Patent Number: 5,408,875
[45] Date of Patent: Apr. 25, 1995

[54] BALANCING METHOD FOR FLEXIBLE ROTOR AND A BALANCER APPLICABLE TO THE BALANCING METHOD

[75] Inventors: Osami Matsushita; Naohiko Takahashi; Mitsuho Yoneyama, all of Ibaraki; Yasuo Fukushima, Tsuchiura; Minoru Hiroshima, Ushiku; Naohumi Sakanashi; Teturo Ohashi, both of Ibaraki, all of Japan

[73] Assignee: Hitachi, Ltd., Tokyo, Japan

[21] Appl. No.: 885,980

[22] Filed: May 20, 1992

[30] Foreign Application Priority Data

May 30, 1991 [JP] Japan .................. 3-127184

[51] Int. Cl.$^6$ ............................................. G01M 1/24
[52] U.S. Cl. ............................................. 73/462; 73/468
[58] Field of Search ................. 73/460, 462, 468, 471, 73/660, 662, 663, 665, 666, 668, 579; 364/463

[56] References Cited

U.S. PATENT DOCUMENTS

| | | | |
|---|---|---|---|
| 3,141,338 | 7/1964 | Hack | 73/462 |
| 4,098,127 | 7/1978 | Shiga et al. | 73/462 |
| 4,359,896 | 11/1982 | Brown et al. | 73/663 |
| 4,963,804 | 10/1990 | Geiger | 73/660 |
| 5,084,643 | 1/1992 | Chen | 73/462 |

OTHER PUBLICATIONS

Proceedings of 3rd International Conference on Rotordynamics, Sep. 10-12, 1990, Lyon, France, Y. Kanemitsu et al, "Real Time Balancing of a Flexible Rotor Supported by Magnetic Bearing." pp. 263-268.
ISO 5406, "The Mechanical Balancing of Flexible Rotors," First Edition, 1980, pp. 6-9.

*Primary Examiner*—John E. Chapman
*Attorney, Agent, or Firm*—Evenson McKeown Edwards & Lenahan

[57] ABSTRACT

A balancing method for balancing a flexible rotor is disclosed. First, the rotor is rotated and vibration of the rotor is measured to determine resonance speeds. Vibration exciting forces of frequencies synchronized with the rotor rotation in two orthogonal directions are imparted to the rotor or rotor support bearings while rotating the rotor at a speed near the respective resonance speeds. The amplitude and the phase of the vibration exciting force which reduces the resonance vibration of the rotor are then determined. A correction weight on the basis of the amplitude and the phase of the vibration exciting force is then determined. Balancing work on the rotor such as grinding of the rotor or addition of a mass to the rotor in accordance with the correction weight is then carried out, followed by a rotor rotation conducted for the purpose of confirming the effect of the balancing work.

10 Claims, 6 Drawing Sheets

BALANCING METHOD FOR FLEXIBLE ROTOR AND A BALANCER APPLICABLE TO THE BALANCING METHOD

BACKGROUND OF THE INVENTION

The present invention relates to a balancing method for a rotor which is driven at a speed near or above its critical speed, i.e., a flexible rotor and a balancer applicable to the balancing method.

Figure 2:
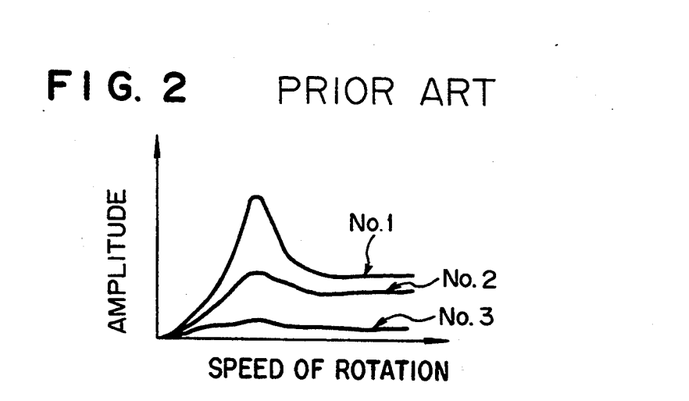
FIG. 2 is a graph showing a response amplitude curve of a rotor, illustrative of a conventional flexible rotor balancing method.
Figure 3:
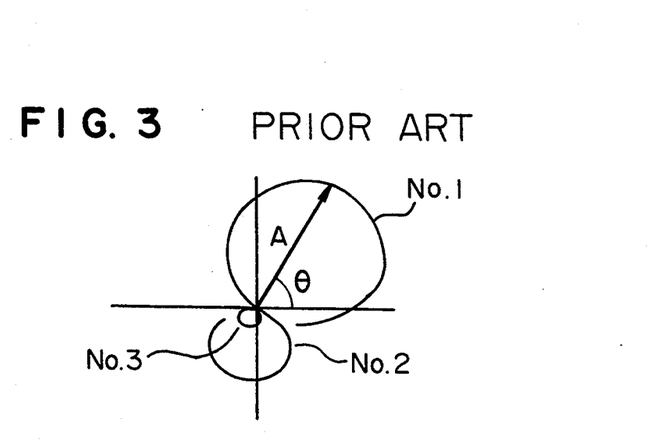
FIG. 3 is a graph showing a vibration vector curve of a rotor, illustrative of a conventional flexible rotor balancing method.

A conventional balancing method for a flexible rotor will be described with reference to FIGS. 1 to 3.

Figure 1:
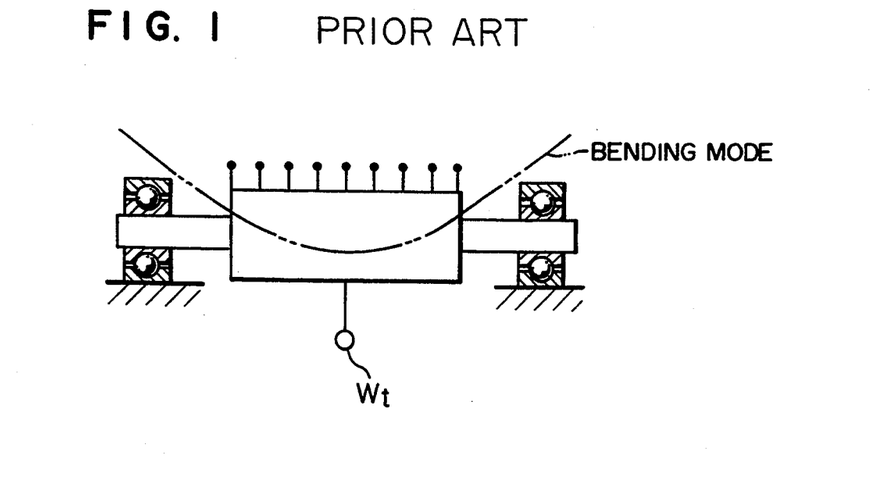
FIG. 1 is a schematic illustration of a resonance bend mode of a flexible rotor and adding a test weight for correcting the resonance bending.

A rotor shown in FIG. 1 resonates when its rotational speed is increased to a level near its natural frequency, so that it exhibits a bending mode as shown by an imaginary line in FIG. 1. When this is shown by a response amplitude curve, the phenomenon is shown by a curve No. 1 in FIG. 2 and when by a polar coordinate representation of the bend mode in the form of a vibration vector determined by response amplitude A and a phase $\theta$, it is shown by a curve No. 1 in FIG. 3.

Then, the rotor is stopped and disassembled, and a test weight Wt is attached to the rotor. The rotor is then assembled and operated again for the measurement of vibration. It is assumed here that curves denoted by No. 2 in FIGS. 2 and 3 are obtained as the response amplitude and vibration vector. Then, influence coefficient indicative of the influence of the test weight Wt is determine based on the curves No. 1 and curves No. 2 in FIGS. 2 and 3, and the position and mass of a correction weight Wc is determined on the basis of the influence coefficient.

Then, the rotor is stopped and disassembled, and the correction weight Wc determined as above is attached to the rotor. The rotor is then assembled and operated again for the purpose of confirmation of the effect of the correction weight Wc. If the response amplitude and vibration vector as shown in FIGS. 2 and 3 by curves No. 3 are obtained, it is decided that the correction weight Wc has been determined correctly.

The described process, however, is an ideal one. Actually, operation with correction weight often fails to provide desired vibration characteristics. Consequently, steps have to be repeatedly executed for determining the correction weight, until the desired vibration characteristic is obtained.

The described balancing method is a method considering only correction plane to which a correction weight is mounted. When there are a plurality of correction planes, it is necessary to determine the influence coefficient for each of such correction planes. For instance, when there are three correction planes, operation with the test weight has to be conducted three times.

The described process is for obtaining balance against first order mode resonance shown in FIG. 1. An impractically large number of steps, requiring much time and labor, are necessary when balance has to be attained for resonance of higher orders such as resonance of second order or ternary mode.

Meanwhile, many reports have been made regarding suppression of rotor resonance by electrial means. For instance, an article of Kanamitsu et al., PROCEEDING OF 3rd INTERNATIONAL CONFERENCE ON ROTOR-DYNAMICS (1990.9.10-12, LYON-FRANCE), pp 263-268, discloses that vibration of a rotor carried by magnetic bearings can be reduced by application of a vibration exciting force synchronous with the rotor rotation from the magnetic bearings to the rotor and that the vibration is increased again when this external vibration exciting force is nullified.

This method, however, is applicable only to rotors which are supported by active type bearings such as magnetic bearings but is not applicable to rotors supported by passive type bearings such as slide bearings, ball bearings or oil film bearings.

SUMMARY OF THE INVENTION

Accordingly, an object of the present invention is to provide a balancing method for balancing a flexible rotor with a reduced number of steps of work and regardless of the type of the bearing.

Another object of the present invention is to provide a balancer suitable for use in carrying out the balancing method of the invention.

To these ends, according to one aspect of the invention, there is provided a balancing method for balancing a flexible rotor, comprising the steps of: rotating the rotor and measuring vibration of the rotor to determine resonance speed; imparting, to the rotor or to bearings supporting the rotor, vibration exciting forces of frequencies synchronized with the rotor rotation in two orthogonal directions, while rotating the rotor at a speed near the resonance speed; determining the amplitude and the phase of the vibration exciting force which reduces the resonance vibration of the rotor; determining a correction weight on the basis of the amplitude and the correction weight; and effecting a balancing work on the rotor such as grinding of the rotor or addition of a mass to the rotor in accordance with the correction weight, followed by a rotor rotation conducted for the purpose of confirming the effect of the correction weight.

According to another aspect of the invention, there is provided a balancer for balancing a flexible rotor, comprising: a table on which bearings are mounted for supporting the rotor; a measuring device for measuring the vibration of the table; a vibration exciting device for imparting vibration exciting forces to the table in two orthogonal directions; and a synchronized two phase oscillator for delivering to the vibration exciting device a sine wave signal synchronized with the rotor rotation, the synchronized two phase oscillator being capable of varying the amplitude and the phase of the sine wave signal.

The method of the present invention makes it possible to balance a flexible rotor by two steps: namely, in the first step, an operation No. 1 for determining the resonance speed of the rotor and an operation No. 2 for determining external vibration exciting force for reducing resonance are effected at the same time, and in the second step, an operation No. 3 for confirming the effect of the correction weight determined on the basis of the external vibration exciting force is effected. In addition, balance can be attained regardless of the type of the bearing which is in support of the flexible rotor.

DESCRIPTION OF THE PREFERRED EMBODIMENTS

A description will now be given of an embodiment of the flexible rotor balancing method of the present invention applied to a rotor supported by magnetic bearings, with reference to FIGS. 4 to 7.

Figure 4:
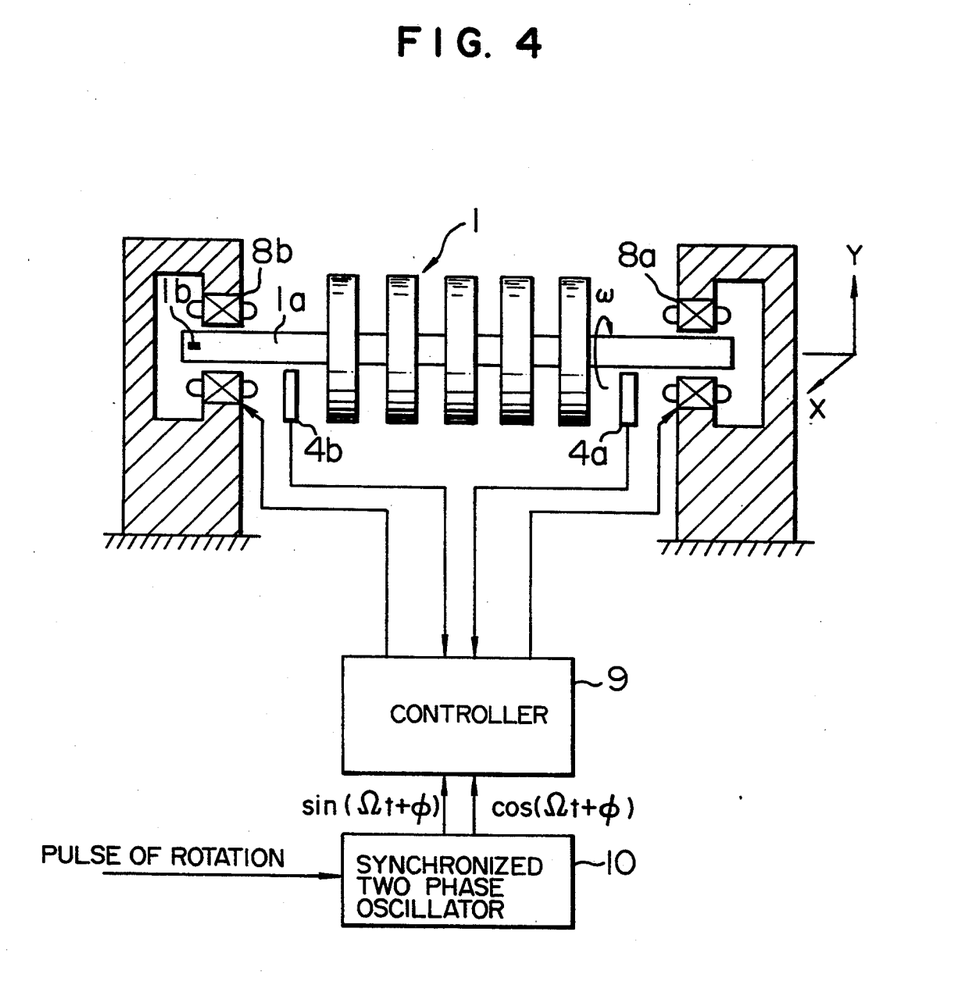
FIG. 4 is a schematic illustration of a flexible rotor balancing method of the invention applied to a flexible rotor supported by magnetic bearings.

A rotor 1 is supported at its both ends by magnetic bearings 8a and 8b. Displacement meters 4a and 4b capable of detecting vibration of the rotor 1 are disposed near the bearings 8a and 8b. These displacement meters 4a and 4b are connected to a controller 9 so that results of detection of vibration of the rotor 1 by the displacement meters 4a and 4b are received by the controller 9. A position signal indicative of the position of the rotor 1, detected by the displacement meters 4a and 4b, is delivered to the controller 9. In response to the position signal, the controller produces an output current which is delivered to the magnetic bearings 8a and 8b, so that the rotor is lifted to a neutral position by the magnetic attracting force exerted by the magnetic bearings. The construction and the function of the magnetic bearings are as described hereinbefore. The rotor 1 is carried by a rotor shaft 1a which is provided on one end thereof with an eyemark 1b associated with a tachometer (not shown). The tachometer is adapted to emit a pulse for each rotation of the rotor 1, upon receipt of reflection by the eyemark 1b. The pulses are input to a synchronized two phase oscillator 10. The synchronized two-phase oscillator 10 has a function to generate two-phase synchronized signals, i.e., a cosine wave signal and a sine wave signal synchronous with the pulses, and is connected to a controller 9.

Figure 5:
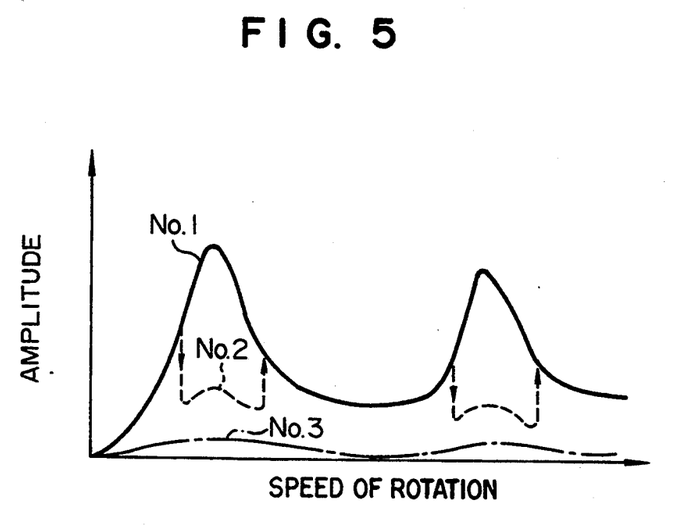
FIG. 5 is a graph showing a response amplitude curve as obtained with the rotor explained in connection with FIG. 4.

The rotor 1 vibrates with large amplitude when its rotation speed reaches a range around the resonance speed as shown in FIG. 5. When the rotor is further accelerated carefully past the resonance speed, the response amplitude curve exhibits a peak, as will be seen from a curve No. 1 in FIG. 5. When this is shown by a polar coordinate in terms of vibration vector determined by amplitude and phase, it is shown by a curve No. 1 in FIG. 6.

Subsequently, the rotor speed is set at a level near the resonance speed, and a sine wave signal synchronous with the rotor rotation is generated by the oscillator 10. This sine wave signal is input to the controller 9 so as to be superposed on the rotor-lifting control signal. The composite signal having the sine wave component and the control signal component is supplied to the magnetic bearings 8a and 8b. Consequently, cosine and sine vibration exciting forces are applied to the rotor 1 in two orthogonal directions X and Y. More specifically, the vibration exciting forces in X and Y directions are respectively represented by the following formulae:

$$Fx = Fo \cos(\Omega t + \Phi)$$

$$Fy = Fo \sin(\Omega t + \Phi)$$

Fo represents the magnitude of the vibration exciting force, $\Phi$ represents phase difference with respect to the rotor rotation pulse and $\Omega$ represents the rotation speed.

Figure 6:
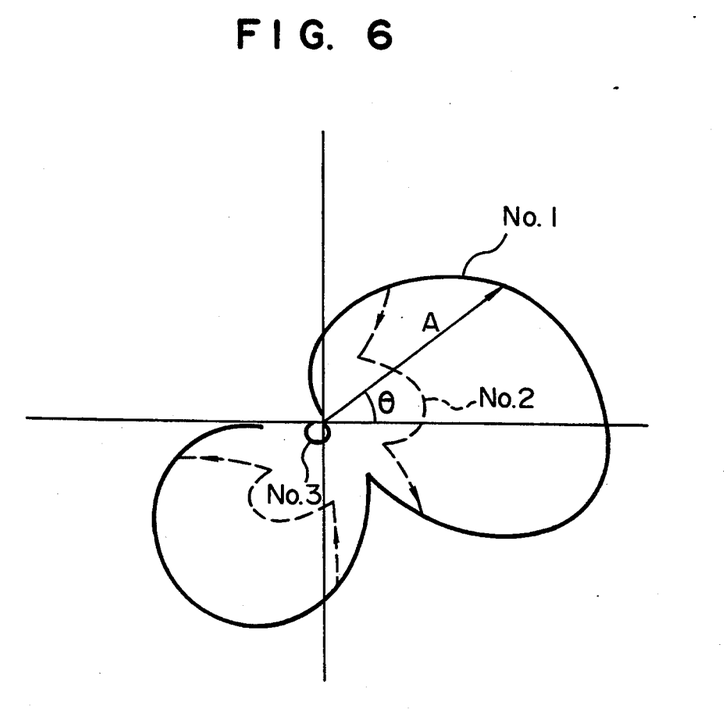
FIG. 6 is a graph showing a vibration vector curve as obtained with the rotor explained in connection with FIG. 4.

Then, the oscillator 10 is controlled to vary the magnitude Fo of the vibration exciting force of the sine wave signal and the phase difference $\Phi$, for the purpose of determining the vibration exciting force magnitude Fo and the phase difference $\Phi$ which reduce the rotor vibration (see curve No. 2 of FIGS. 5 and 6).

The rotor is then stopped and a correction weight is determined on the basis of the vibration exciting force magnitude Fo and the phase difference $\Phi$ which reduce the rotor vibration.

Various methods are available for determining the correction weight, from the theory of dynamic balancing of rotational mass. In this embodiment, a method known as modal balance method as illustrated in FIG. 7 is used as the method for determining the correction weight.

Figure 7:
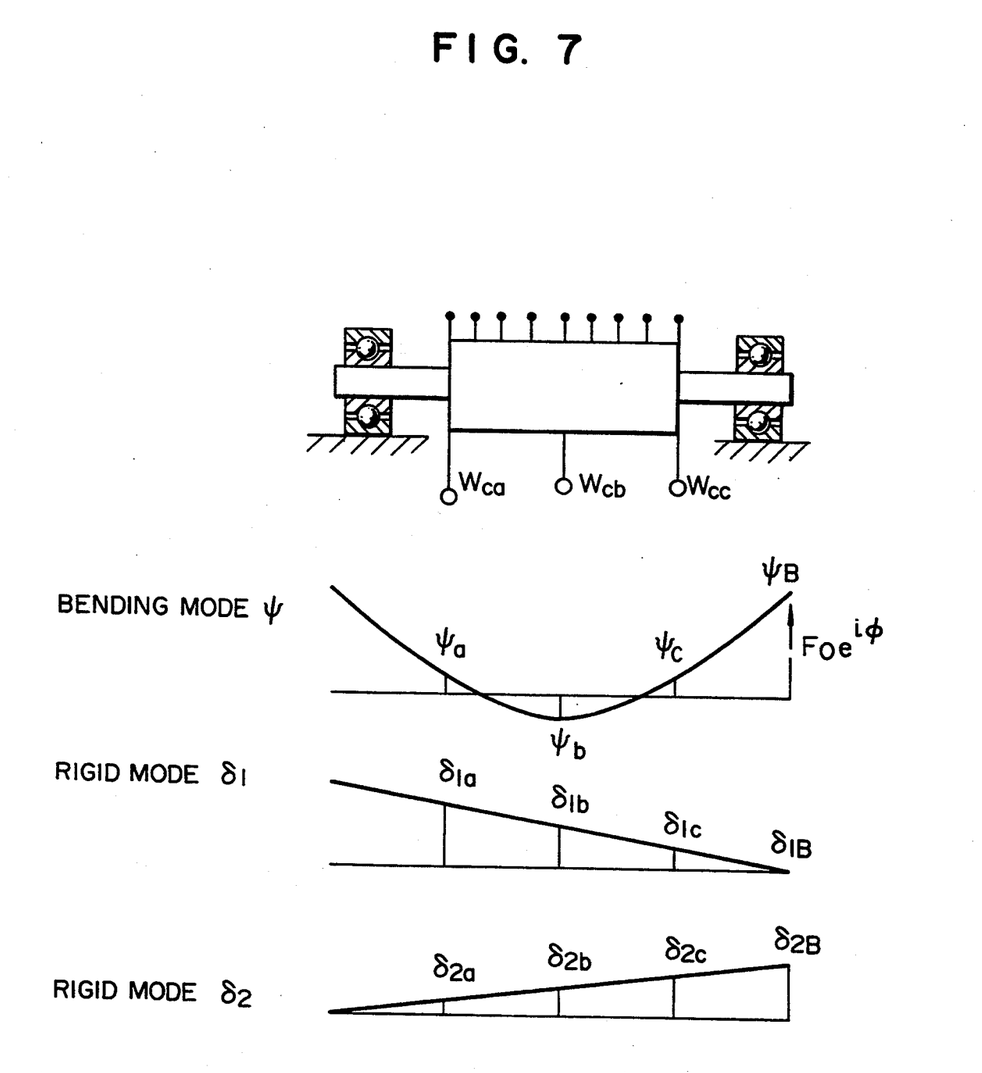
FIG. 7 is a schematic illustration explanatory of modal balancing method used in determining correction weight on the basis of external vibration exciting force applied to the rotor.

Referring to FIG. 7, the rigid modes of the rotor 1 are represented by $\delta_1$ and $\delta_2$ and the resonance bend mode is represented by $\Psi$. The position of a bearing is indicated by B, and three correction planes are considered. The positions of these three correction planes are indicated by a, b and c. Correction weight vectors Wc at the positions of the respective correction planes are indicated by Wca, Wcb and Wcc, respectively. The following formulae are obtained from a requirement that the rigid balance of the rotor should not be lost.

$$\delta_{1a} \cdot Wca + \delta_{1b} \cdot Wcb + \delta_{1c} \cdot Wcc = 0 \qquad \ldots(1)$$

$$\delta_{2a} \cdot Wca + \delta_{2b} \cdot Wcb + \delta_{2c} \cdot Wcc = 0 \qquad \ldots(2)$$

The formulae (1) and (2) indicate that the inner product of the rigid mode and the correction weight must be 0 (zero). With respect to the bend mode $\Psi$, the following formula is established since a vibration exciting force must be generated by the correction weight.

$$\Psi_a \cdot Wca + \Psi_b \cdot Wcb + \Psi_c \cdot Wcc = \Psi B \cdot Fo \cdot e^{i\Phi} \qquad \ldots(2)$$

Formulae (1) to (3) are solved to determine Wc which is unknown, whereby the conditions for attaining balance are obtained. The rotor mass is then adjusted by grinding the rotor or adding masses to the rotor in accordance with the above-mentioned conditions, thus effecting balancing correction.

The rotor after the balancing correction is then rotated for the purpose of confirming that the rotor has been balanced (see curve No. 3 of FIGS. 5 and 6).

In FIG. 5, there are two resonance speeds below the rated speed of the rotor. The above-described balancing process can be equally adopted when two or more resonance speeds exist below the rated speed. In such a case, an influence coefficient of the vibration exciting force applied by the magnetic bearing is determined first for the first order resonance mode and then for the second order resonance mode. That is, vibration exciting forces necessary for reducing vibrations of first order and second order modes are determined. To this end, the number of the correction planes is increased and the balancing conditions for the respective modes expressed by the formulae (1), (2) and (3) are developed for the second order vibration mode, thus determining correction weights. Balancing work such as grinding or addition of masses is then conducted in accordance with the thus-determined correction weight.

A description will now be given with reference to FIG. 8 as to another embodiment of the balancing method applied to a rotor which is supported by passive-type bearings.

Figure 8:
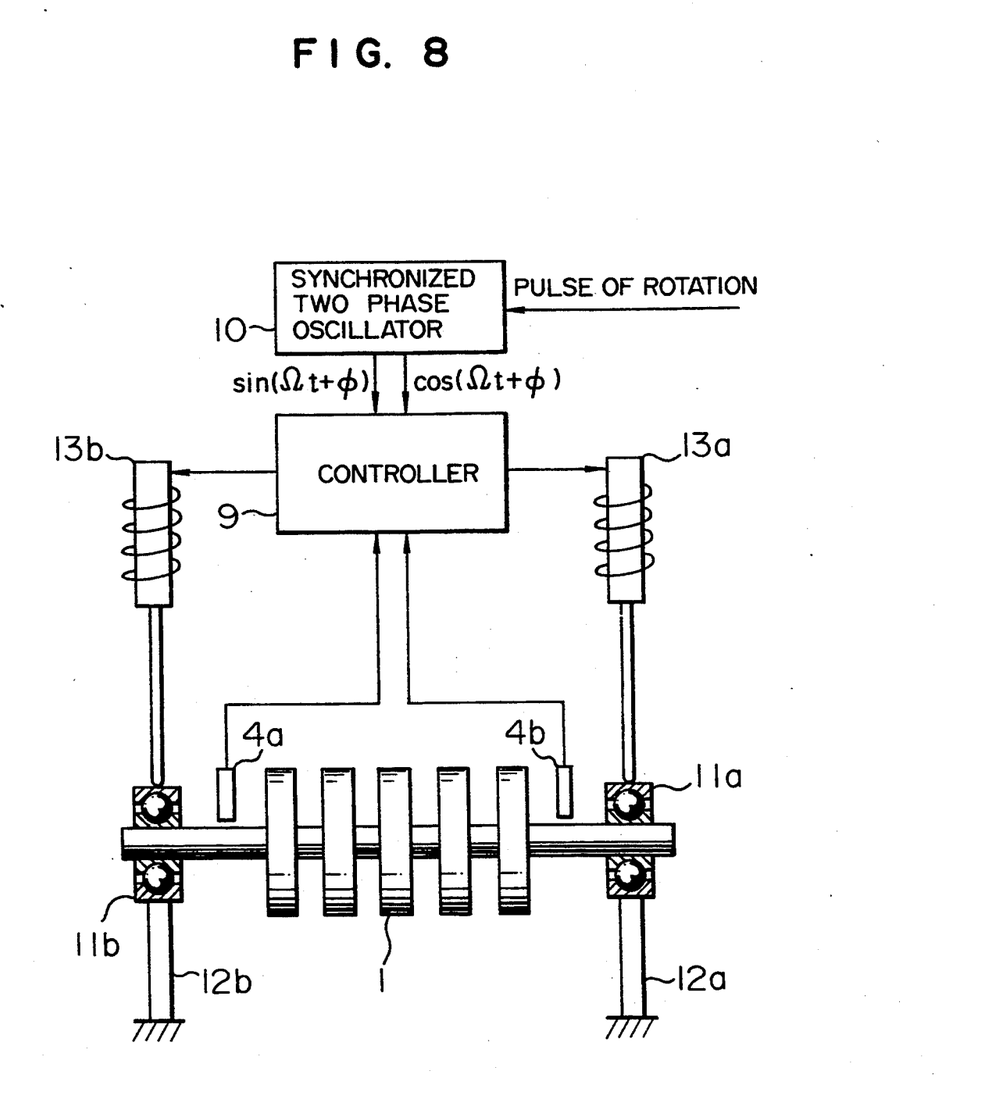
FIG. 8 is a schematic illustration of a flexible rotor balancing method of the invention applied to a rotor supported by passive type bearings.

Referring to FIG. 8, a rotor 1 is supported by ball bearings 11a and 11b. A bearing bed 12a on which the ball bearing 11a is mounted is provided with electric actuators 13a and 13c which are adapted to provide sine wave vibration exciting forces in two orthogonal directions X and Y (the actuator 13c is not shown). Similarly, a bearing bed 12b on which the ball bearing 11b is mounted is provided with electric actuators 13b and 13d which are adapted to impart sine wave vibration exciting forces in two orthogonal directions X and Y (the actuator 13d is not shown). Thus, the embodiment shown in FIG. 8 is different from the preceding embodiment in that the sine wave vibration forces are applied to ball bearings.

The balancing operation is materially the same as that in the preceding embodiment. Namely, balance of the rotor can be attained by two steps of operations of the rotor: namely, in the first step, initial rotor operation for determining the resonance frequency and a rotor operation for determining the vibration exciting force are effected at the same time, and in the second step, a rotor operation for confirming the effect of correction weight determined on the basis of the vibration exciting force is effected.

In the embodiments described hereinbefore, the balancing method is applied to rotors which are supported by bearings. This, however, is only illustrative and the invention can effectively be used in obtaining balance of various types of flexible rotors.

Figure 9:
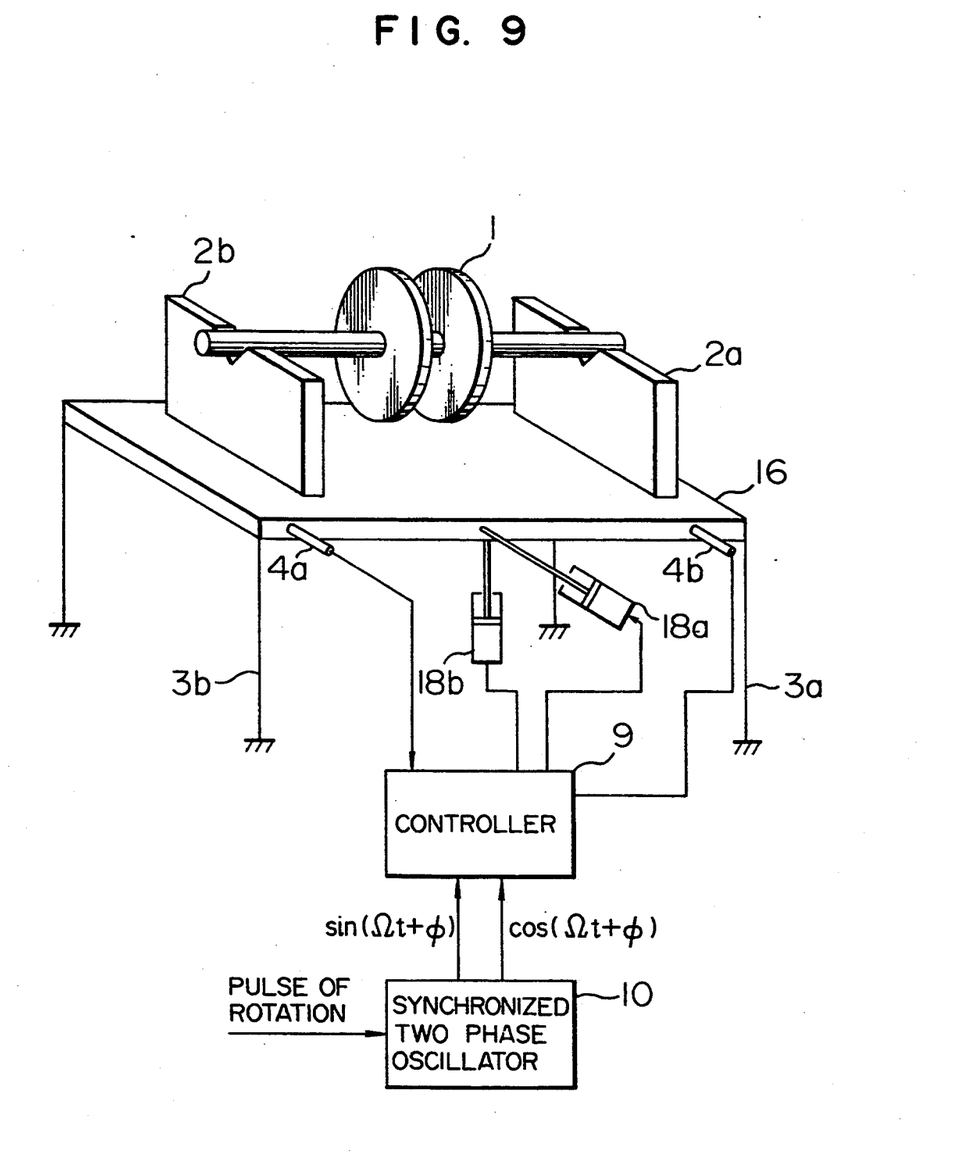
FIG. 9 is a schematic illustration of a balancer suitable for use in carrying out the present invention.

FIG. 9 shows a balancer of the present invention which can generally balance various types of flexible rotors in accordance with the balancing method of the present invention.

The balancer has displacement meters 4a and 4b mounted on a table 16 on which are mounted bearings 2a and 2b. The displacement meters 4a and 4b are connected to a controller 9. A hydraulic cylinder 18a is adapted to impart sine wave vibration exciting force to the table 16 in horizontal directions, while another hydraulic cylinder 18b is adapted to impart sine wave vibration exciting force to the table 16 in vertical directions. The balancer also has a synchronized two phase oscillator 10 which inputs a sine wave signal to the controller 9 in synchronization with the rotation of the rotor 1.

In use, a rotor 1 to be balanced is mounted on the bearings 2a and 2b and is rotated at a high speed by means of, for example, a belt, thereby determining the resonance frequency. Then, the rotor is rotated in a speed region around the resonance speed, and the amplitude and phase of the vibration exciting force are changed by means of the oscillator 10 so as to determine the amplitudes and the phases of vibrations which are caused by the hydraulic cylinders and which minimize the resonance vibration. Then, correction weights are determined on the basis of the amplitudes and the phases, and necessary balancing work is effected on the rotor in accordance with the thus-determined correction weights, such as grinding of the rotor or addition of masses to the rotor, followed by a rotation of the rotor conducted for the purpose of confirming the effect of the correction weight.

What is claimed is:

1. A balancing method for balancing a flexible rotor which is operated above a plurality of resonance speeds thereof, comprising the steps of:
    rotating said rotor and measuring vibration of the rotor to determine a plurality of rotor resonance speeds of the rotating rotor;
    imparting a vibration exciting force to said rotor in two orthogonal directions of frequency synchronized with a rotor rotation speed near each of said plurality of rotor resonance speeds while rotating said rotor;
    determining an amplitude and a phase difference of a correction vibration exciting force which reduces a resonance vibration of the rotor at each of said rotor resonance speeds while rotating said rotor;
    determining correction weight vectors at a predetermined plurality of correction planes spaced from one another along the length of the rotor utilizing the determined amplitude and phase difference of the vibration exciting force at each of said rotor resonance speeds;
    summing up the correction weight vectors for the resonance speeds at each of the correction planes to determine final correction weight vectors at each of the correction planes; and
    applying rotor weight correction by grinding the rotor or adding a mass to the rotor on the basis of the final correction weight vectors at each of the correction planes.

2. A balancing method according to claim 1, further comprising a subsequent step of rotating the rotor and measuring vibration of the rotor to confirm the rotor weight correction.

3. A balancing method according to claim 1, wherein said plurality of resonance speeds includes at least three speeds.

4. A balancing method according to claim 1, wherein said plurality of correction planes, includes more than two correction planes.

5. A balancing method according to claim 2, wherein said plurality of resonance speeds includes at least three speeds.

6. A balancing method according to claim 5, wherein said plurality of correction planes, includes more than two correction planes.

7. A balancing method according to claim 1, wherein said imparting a vibration exciting force includes imparting said force to bearings which support the rotor.

8. A balancing method according to claim 1, wherein said determining correction weight vectors includes using an electronic controller having inputs from a synchronized two phase oscillator, said inputs corresponding to Sin $(\Omega t + \Phi)$ and cos $(\Omega t + \Phi)$, where:
    $\Omega$ = the rotational speed of the rotor
    t = time, and
    $\Phi$ = phase difference with respect to the rotor rotation pulse.

9. A balancer for balancing a flexible rotor, comprising:
- a table on which bearings for supporting said rotor are mounted;
- a measuring device for measuring vibrations of the table;
- a vibration exciting device for imparting vibration forces to said table in two orthogonal directions;
- a synchronized two phase oscillator for delivering to said vibration exciting device a sine wave signal synchronized with the rotor rotation, said synchronized two phase oscillator being capable of varying the amplitude and the phase of said sine wave signal to reduce vibrations of said rotor at resonance speeds thereof; and
- correction weight applying means for applying correction weights to the weight of the rotor based on signals from the oscillator.

10. A balancer assembly for balancing a flexible rotor which is operated above a plurality of resonance speeds thereof, comprising:
- rotor rotating means for rotating said rotor and measuring means for measuring vibration of the rotor to determine a plurality of rotor resonance speeds of the rotating rotor;
- vibration force imparting means for imparting a vibration exciting force to said rotor in two orthogonal directions of frequency synchronized with a rotor rotation speed near each of said plurality of rotor resonance speeds while rotating said rotor;
- amplitude and phase difference determining means for determining an amplitude and a phase difference of a correction vibration exciting force which reduces a resonance vibration of the rotor at each of said rotor resonance speeds while rotating said rotor;
- correction weight determining means for determining correction weight vectors at a predetermined plurality of correction planes spaced from one another along the length of the rotor utilizing the determined amplitude and phase difference of the vibration exciting force at each of said rotor resonance speeds;
- summing means for summing up the correction weight vectors for the resonance speeds at each of the correction planes to determine final correction weight vectors at each of the correction planes; and
- rotor weight correction means for applying rotor weight correction by grinding the rotor or adding a mass to the rotor on the basis of the final correction weight vectors at each of the correction planes.

* * * * *